US012087124B2

(12) United States Patent
Marsh et al.

(10) Patent No.: US 12,087,124 B2
(45) **Date of Patent: *Sep. 10, 2024**

(54) SYSTEMS AND METHODS FOR ELECTRONIC GAMING IN WHICH AN ACTIVE AREA ALTERNATES BETWEEN SETS OF REELS

(71) Applicant: Aristocrat Technologies Australia Pty Limited, North Ryde (AU)

(72) Inventors: David Marsh, Charlottesville, VA (US); Karl Roelofs, Charlottesville, VA (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/468,348

(22) Filed: Sep. 15, 2023

(65) Prior Publication Data

US 2024/0005724 A1 Jan. 4, 2024

Related U.S. Application Data

(63) Continuation of application No. 17/409,440, filed on Aug. 23, 2021, now Pat. No. 11,804,097, which is a (Continued)

(51) Int. Cl.

*G07F 17/32* (2006.01)
*G06Q 50/34* (2012.01)
*G07F 17/34* (2006.01)

(52) U.S. Cl.

CPC ...... *G07F 17/3213* (2013.01); *G07F 17/3267* (2013.01); *G07F 17/34* (2013.01); *G06Q 50/34* (2013.01); *G07F 17/3288* (2013.01)

(58) Field of Classification Search

CPC .. G07F 17/3213; G07F 17/34; G07F 17/3267; G07F 17/3288; G06Q 50/34

See application file for complete search history.

(56) References Cited

U.S. PATENT DOCUMENTS 5,971,849 A 10/1999 Falciglia
6,146,271 A 11/2000 Kadlic
(Continued)

FOREIGN PATENT DOCUMENTS

AU 2004202643 B2 1/2005
AU 2007231800 B2 5/2012
(Continued)

OTHER PUBLICATIONS

Office Action dated Mar. 21, 2024 for U.S. Appl. No. 18/348,577 (pp. 1-7).

(Continued)

*Primary Examiner* — Thomas H Henry
(74) *Attorney, Agent, or Firm* — Armstrong Teasdale LLP

(57) ABSTRACT

An electronic gaming machine includes a game controller configured to execute instructions stored in a tangible, non-transitory, computer-readable storage medium, which, when executed by the game controller, cause the game controller to at least: (i) simulate spinning and stopping a first plurality of reels to display a first plurality of symbols from each reel of the first plurality of reels, wherein, while the first plurality of reels are spinning, a second plurality of reels are held stationary; (ii) determine whether the first plurality of symbols include at least one trigger symbol; and (iii) simulate spinning and stopping, in response to the at least one trigger symbol, the second plurality of reels to display a second plurality of symbols from each reel of the second plurality of reels, wherein, while the second plurality of reels are spinning, the first plurality of reels are held stationary.

20 Claims, 5 Drawing Sheets

Related U.S. Application Data continuation of application No. 16/122,592, filed on Sep. 5, 2018, now Pat. No. 11,100,748.

(56) References Cited

U.S. PATENT DOCUMENTS

| | | | |
|---|---|---|---|
| 6,234,897 | B1 | 5/2001 | Frohm |
| 6,299,165 | B1 | 10/2001 | Nagano |
| 6,582,305 | B1 | 6/2003 | Carter |
| 6,626,758 | B1 | 9/2003 | Parham |
| 7,052,395 | B2 | 5/2006 | Glavich |
| 7,097,560 | B2 | 8/2006 | Okada |
| 7,166,028 | B2 | 1/2007 | Fasbender |
| 7,300,351 | B2 | 11/2007 | Thomas |
| 7,632,184 | B2 | 12/2009 | Gauselmann |
| 7,704,137 | B2 | 4/2010 | Englman |
| 7,740,245 | B2 | 6/2010 | Tarantino |
| 7,749,072 | B1 | 7/2010 | Singer |
| 7,846,018 | B2 | 12/2010 | Baerlocher |
| 7,938,719 | B2 | 5/2011 | Fasbender |
| 7,993,195 | B2 | 8/2011 | Belger |
| 8,287,367 | B2 | 10/2012 | Hall |
| 8,323,094 | B2 | 12/2012 | Palermo |
| 8,454,429 | B2 | 6/2013 | Jaffe |
| 8,506,380 | B2 | 8/2013 | Hughes |
| 8,506,386 | B2 | 8/2013 | Harris |
| 8,696,436 | B2 | 4/2014 | Acres |
| 8,708,806 | B2 | 4/2014 | Wabschall |
| 9,017,160 | B2 | 4/2015 | Moroney |
| 9,064,383 | B2 | 6/2015 | Palermo |
| 9,728,043 | B2 | 8/2017 | Acres |
| 9,959,708 | B2 | 5/2018 | Caputo |
| 10,614,666 | B2 | 4/2020 | Eubanks |
| 11,043,075 | B2 | 6/2021 | Eubanks |
| 11,423,744 | B2 | 8/2022 | Eubanks |
| 11,769,374 | B2 | 9/2023 | Eubanks |
| 2002/0010016 | A1 | 1/2002 | Tsukahara |
| 2002/0086725 | A1 | 7/2002 | Fasbender |
| 2002/0155880 | A1 | 10/2002 | Glavich |
| 2003/0032470 | A1 | 2/2003 | Weiss |
| 2003/0060276 | A1 | 3/2003 | Walker |
| 2003/0064797 | A1 | 4/2003 | Jackson |
| 2003/0114217 | A1 | 6/2003 | Walker |
| 2003/0125100 | A1 | 7/2003 | Cannon |
| 2003/0236118 | A1 | 12/2003 | Okada |
| 2004/0023709 | A1 | 2/2004 | Beaulieu |
| 2004/0033827 | A1 | 2/2004 | Gilmore |
| 2004/0053666 | A1 | 3/2004 | Vancura |
| 2004/0082384 | A1 | 4/2004 | Walker |
| 2004/0087360 | A1 | 5/2004 | Chamberlain |
| 2004/0242320 | A1 | 12/2004 | Jackson |
| 2004/0259627 | A1 | 12/2004 | Walker |
| 2004/0266516 | A1 | 12/2004 | Thomas |
| 2005/0060050 | A1 | 3/2005 | Baerlocher |
| 2005/0075156 | A1 | 4/2005 | Seelig |
| 2005/0075163 | A1 | 4/2005 | Cuddy |
| 2005/0153769 | A1 | 7/2005 | Casey |
| 2005/0187005 | A1 | 8/2005 | Rose |
| 2006/0068903 | A1 | 3/2006 | Walker |
| 2006/0079313 | A1 | 4/2006 | Trainor |
| 2006/0111172 | A1 | 5/2006 | Walker |
| 2006/0199634 | A1 | 9/2006 | Anderson |
| 2006/0223632 | A1 | 10/2006 | Walker |
| 2006/0244211 | A1 | 11/2006 | Osawa |
| 2006/0247006 | A1 | 11/2006 | Inamura |
| 2006/0247007 | A1 | 11/2006 | Inamura |
| 2007/0167211 | A1 | 7/2007 | Rodgers |
| 2007/0202943 | A1 | 8/2007 | Thomas |
| 2007/0293297 | A1 | 12/2007 | Schugar |
| 2008/0102916 | A1 | 5/2008 | Kovacs |
| 2008/0108431 | A1 | 5/2008 | Cuddy |
| 2008/0113734 | A1 | 5/2008 | Watkins |
| 2008/0113777 | A1 | 5/2008 | Anderson |
| 2008/0318656 | A1 | 12/2008 | Walker |
| 2009/0017897 | A1 | 1/2009 | Fujimoto |
| 2009/0124332 | A1 | 5/2009 | Baerlocher |
| 2009/0124346 | A1 | 5/2009 | Baerlocher |
| 2009/0197664 | A1 | 8/2009 | Schultz |
| 2009/0200740 | A1 | 8/2009 | Falciglia, Sr. |
| 2009/0239601 | A1 | 9/2009 | Macke |
| 2009/0275387 | A1 | 11/2009 | Yoshizawa |
| 2010/0029364 | A1 | 2/2010 | Zielinski |
| 2010/0056248 | A1 | 3/2010 | Acres |
| 2010/0120492 | A1 | 5/2010 | Davis |
| 2010/0120525 | A1 | 5/2010 | Baerlocher |
| 2010/0124971 | A1 | 5/2010 | Baerlocher |
| 2010/0137056 | A1 | 6/2010 | Hoffman |
| 2011/0045892 | A1 | 2/2011 | Vann |
| 2011/0059791 | A1 | 3/2011 | Tarantino |
| 2011/0118001 | A1 | 5/2011 | Vann |
| 2011/0118006 | A1 | 5/2011 | Acres |
| 2011/0124400 | A1 | 5/2011 | Scholtz |
| 2011/0130198 | A1 | 6/2011 | Van Linden |
| 2011/0244935 | A1 | 10/2011 | Matthews |
| 2011/0269548 | A1 | 11/2011 | Barclay |
| 2012/0034967 | A1 | 2/2012 | Owen |
| 2012/0061150 | A1 | 3/2012 | Coulombe |
| 2012/0122543 | A1 | 5/2012 | Watkins |
| 2012/0157195 | A1 | 6/2012 | Sum |
| 2012/0172108 | A1 | 7/2012 | Acres |
| 2012/0172130 | A1 | 7/2012 | Acres |
| 2012/0270638 | A1 | 10/2012 | Eubanks |
| 2013/0005446 | A1 | 1/2013 | Englman |
| 2013/0065663 | A1 | 3/2013 | Johnson |
| 2013/0065665 | A1 | 3/2013 | Watkins |
| 2013/0157756 | A1 | 6/2013 | Hall |
| 2014/0087829 | A1 | 3/2014 | Watkins |
| 2014/0094303 | A1 | 4/2014 | Wabschall |
| 2014/0179396 | A1 | 6/2014 | Aoki |
| 2014/0221071 | A1 | 8/2014 | Calio |
| 2014/0302909 | A1 | 10/2014 | Meyer |
| 2014/0342802 | A1 | 11/2014 | Itagaki |
| 2014/0349732 | A1 | 11/2014 | Pawloski |
| 2015/0018070 | A1 | 1/2015 | Meyer |
| 2015/0045106 | A1 | 2/2015 | You |
| 2015/0087382 | A1 | 3/2015 | Gilbertson |
| 2015/0221176 | A1 | 8/2015 | Meyer |
| 2015/0228163 | A1 | 8/2015 | Clarebrough |
| 2015/0302482 | A1 | 10/2015 | Vagner |
| 2015/0356813 | A1 | 12/2015 | Mead |
| 2015/0379809 | A1 | 12/2015 | Clarebrough |
| 2016/0049050 | A1 | 2/2016 | Berman |
| 2016/0358412 | A1 | 12/2016 | Eaton |
| 2017/0024970 | A1 | 1/2017 | Sherrets |
| 2017/0032609 | A1 | 2/2017 | Inamura |
| 2017/0032611 | A1 | 2/2017 | Luong |
| 2017/0092071 | A1 | 3/2017 | Cuddy |
| 2017/0124805 | A1 | 5/2017 | Prabhu |
| 2017/0178460 | A1 | 6/2017 | Berman |
| 2017/0301175 | A1 | 10/2017 | Acres |
| 2017/0301177 | A1 | 10/2017 | Pawloski |
| 2019/0318579 | A1 | 10/2019 | Marsh |
| 2020/0265681 | A1 | 8/2020 | Eubanks |
| 2020/0265682 | A1 | 8/2020 | Eubanks |
| 2021/0312762 | A1 | 10/2021 | Eubanks |
| 2022/0406142 | A1 | 12/2022 | Eubanks |
| 2023/0306821 | A1 | 9/2023 | Eubanks |

FOREIGN PATENT DOCUMENTS

| | | | |
|---|---|---|---|
| AU | 2011285816 | B2 | 4/2015 |
| AU | 2016234913 | A1 | 4/2017 |
| JP | 2016202587 | A | 12/2016 |

OTHER PUBLICATIONS

Notice of Allowance dated Apr. 5, 2024 for U.S. Appl. No. 18/328,068 (pp. 1-8).

Australian Examination Report No. 1 issued in App. No. AU2019213428, dated May 1, 2024, 3 pages.

Office Action (Non-Final Rejection) dated Dec. 21, 2023 for U.S. Appl. No. 18/328,068 (pp. 1-18).

Office Action (Notice of Allowance and Fees Due (PTOL-85)) dated Dec. 21, 2023 for U.S. Appl. No. 18/048,337 (pp. 1-5).

(56) References Cited

OTHER PUBLICATIONS

Australian Examination Report No. 1 issued in App. No. AU2019202557, dated Jan. 24, 2024, 3 pages.
Notice of Allowance dated Jun. 4, 2020 for U.S. Appl. No. 16/100,851 (pp. 1-7).
Office Action dated Oct. 28, 2020 for U.S. Appl. No. 16/841,290 (pp. 1-17).
Notice of Allowance dated Sep. 25, 2020 for U.S. Appl. No. 16/100,851 (pp. 1-5).
Notice of Allowance dated Sep. 3, 2020 for U.S. Appl. No. 15/951,802 (pp. 1-8).
Office Action dated Feb. 4, 2021 for U.S. Appl. No. 16/841,290 (pp. 1-8).
Notice of Allowance dated Feb. 24, 2021 for U.S. Appl. No. 16/841,290 (pp. 1-9).
Office Action dated Jan. 25, 2021 for U.S. Appl. No. 16/841,337 (pp. 1-11).
Office Action dated Feb. 5, 2021 for U.S. Appl. No. 16/122,592 (pp. 1-9).
Australian Examination Report No. 1 for App. No. AU2016234913, dated Feb. 9, 2021, 4 pages.
Notice of Allowance dated Apr. 28, 2021 for U.S. Appl. No. 16/122,592 (pp. 1-9).
Notice of Allowance dated Feb. 24, 2021 for U.S. Appl. No. 16/841,337 (pp. 1-9).
Office Action (Non-Final Rejection) dated Apr. 14, 2022 for U.S. Appl. No. 17/347,279 (pp. 1-8).
Office Action (Non-Final Rejection) dated Sep. 10, 2021 for U.S. Appl. No. 17/069,564 (pp. 1-11).
Office Action (Non-Final Rejection) dated Feb. 8, 2022 for U.S. Appl. No. 17/091,740 (pp. 1-14).
Office Action (Notice of Allowance and Fees Due (PTOL-85)) dated Mar. 24, 2022 for U.S. Appl. No. 17/069,564 (pp. 1-9).
Office Action (Non-Final Rejection) dated Mar. 24, 2022 for U.S. Appl. No. 17/104,390 (pp. 1-6).
Office Action (Notice of Allowance and Fees Due (PTOL-85)) dated May 10, 2022 for U.S. Appl. No. 17/347,279 (pp. 1-8).
Office Action (Notice of Allowance and Fees Due (PTOL-85)) dated Jun. 17, 2022 for U.S. Appl. No. 17/104,390 (pp. 1-8).
Office Action (Notice of Allowance and Fees Due (PTOL-85)) dated Jul. 7, 2022 for U.S. Appl. No. 17/091,740 (pp. 1-5).
Office Action (Non-Final Rejection) dated Apr. 27, 2023 for U.S. Appl. No. 17/892,674 (pp. 1-9).
Australian Examination Report No. 1 issued in App. No. AU2022200674, dated Dec. 20, 2022, 4 pages.
Office Action (Non-Final Rejection) dated Feb. 16, 2023 for U.S. Appl. No. 17/872,947 (pp. 1-6).
Office Action (Notice of Allowance and Fees Due (PTOL-85)) dated Apr. 5, 2023 for U.S. Appl. No. 17/872,947 (pp. 1-8).
Office Action (Notice of Allowance and Fees Due (PTOL-85)) dated Jun. 14, 2023 for U.S. Appl. No. 17/892,674 (pp. 1-8).
Office Action (Notice of Allowance and Fees Due (PTOL-85)) dated Jun. 26, 2023 for U.S. Appl. No. 17/409,440 (pp. 1-8).
Office Action (Non-Final Rejection) dated Sep. 28, 2023 for U.S. Appl. No. 18/048,337 (pp. 1-7).

SYSTEMS AND METHODS FOR ELECTRONIC GAMING IN WHICH AN ACTIVE AREA ALTERNATES BETWEEN SETS OF REELS

CROSS-REFERENCE TO RELATED APPLICATION

This application is a continuation of and claims priority to U.S. patent application Ser. No. 17/409,440, filed Aug. 23, 2021, which is a continuation of U.S. patent application Ser. No. 16/122,592, now U.S. Pat. No. 11,100,748, filed Sep. 5, 2018, which is hereby incorporated by reference in its entirety.

TECHNICAL FIELD

The field of disclosure relates generally to electronic gaming, and more particularly to systems and methods for electronic gaming in which an active area of a wagering game displayed by an electronic gaming machine alternates between a first plurality of reels and a second plurality of reels based upon the occurrence of one or more trigger conditions.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to “cash out.”

Slot games are often displayed to the player in the form of various symbols arranged in a row-by-column grid, or “matrix.” Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a “pay-table” that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many conventional gaming machines are also configured to present a base or primary game as well as a bonus or secondary game, which may be triggered from the primary game, such as, for example, based upon the occurrence of a winning pattern of symbols occurring in the primary game. Many types of bonus games have been devised. However, new and exciting bonus games are desirable and player demand for such games continues undiminished.

BRIEF DESCRIPTION

In one aspect, an electronic gaming machine is provided. The electronic gaming machine includes a display, a credit input mechanism, and a game controller configured to execute instructions stored in a tangible, non-transitory, computer-readable storage medium, which, when executed by the game controller, cause the game controller to at least: (i) simulate spinning and stopping a first plurality of reels to display a first plurality of symbols from each reel of the first plurality of reels, wherein, while the first plurality of reels are spinning, a second plurality of reels are held stationary; (ii) determine whether the first plurality of symbols include at least one trigger symbol; and (iii) simulate spinning and stopping, in response to the at least one trigger symbol, the second plurality of reels to display a second plurality of symbols from each reel of the second plurality of reels, wherein, while the second plurality of reels are spinning, the first plurality of reels are held stationary.

In another aspect, a method for presenting a wagering game on an electronic gaming machine is provided. The electronic gaming machine includes a display configured to present the wagering game, a player input interface, a game controller, and a credit input mechanism including at least one of a card reader, a ticket reader, a bill validator, and a coin input mechanism. The method includes: (i) simulating, by the game controller, spinning and stopping a first plurality of reels to display a first plurality of symbols from each reel of the first plurality of reels, wherein, while the first plurality of reels are spinning, a second plurality of reels are held stationary; (ii) determining, by the game controller, whether the first plurality of symbols include at least one trigger symbol; and (iii) simulating, by the game controller, spinning and stopping, in response to the at least one trigger symbol, the second plurality of reels to display a second plurality of symbols from each reel of the second plurality of reels, wherein, while the second plurality of reels are spinning, the first plurality of reels are held stationary.

In yet another aspect, a computer-readable storage medium is provided. The computer-readable storage medium includes computer-executable instructions embodied thereon, which when executed by a game controller of an electronic gaming machine, cause the game controller to at least: (i) simulate spinning and stopping a first plurality of reels to display a first plurality of symbols from each reel of the first plurality of reels, wherein, while the first plurality of reels are spinning, a second plurality of reels are held stationary; (ii) determine whether the first plurality of symbols include at least one trigger symbol; and (iii) simulate spinning and stopping, in response to the at least one trigger symbol, the second plurality of reels to display a second plurality of symbols from each reel of the second plurality of reels, wherein, while the second plurality of reels are spinning, the first plurality of reels are held stationary.

BRIEF DESCRIPTION OF THE DRAWINGS

An example embodiment of the subject matter disclosed will now be described with reference to the accompanying drawings.

DETAILED DESCRIPTION

An electronic gaming machine configured to alternate between a first plurality of reels and a second plurality of reels during a free play bonus game is described. In at least one embodiment, the first plurality of reels are displayed below the second plurality of reels to give the appearance of a lower set of reels (e.g., the first plurality of reels) and an upper set of reels (e.g., the second plurality of reels). The first plurality of reels include one or more trigger symbols, such as one or more "bounce up" symbols. Likewise, the second plurality of reels include one or more trigger symbols, such as one or more "bounce down" symbols.

In various embodiments, only one of the first plurality of reels or the second plurality of reels may be "active," in that one of, but not both, of the first plurality of reels or the second plurality of reels may be spun and stopped at any given time. Moreover, in at least one embodiment, if the first plurality of reels are active and a "bounce up" symbol lands or is stopped and displayed from the first plurality of reels, a game controller of the electronic gaming machine may transition the active area or active set of reels from the first plurality of reels to the second plurality of reels. Likewise, if the second plurality of reels are active and a "bounce down" symbols lands or is stopped and displayed from the second plurality of reels, the game controller may transition the active area or active set of reels from the second plurality of reels to the first plurality of reels. Thus, during gameplay, an active area or active set of reels may appear to alternate (or bounce up and down) between the first set of reels and the second set of reels.

Figure 1:
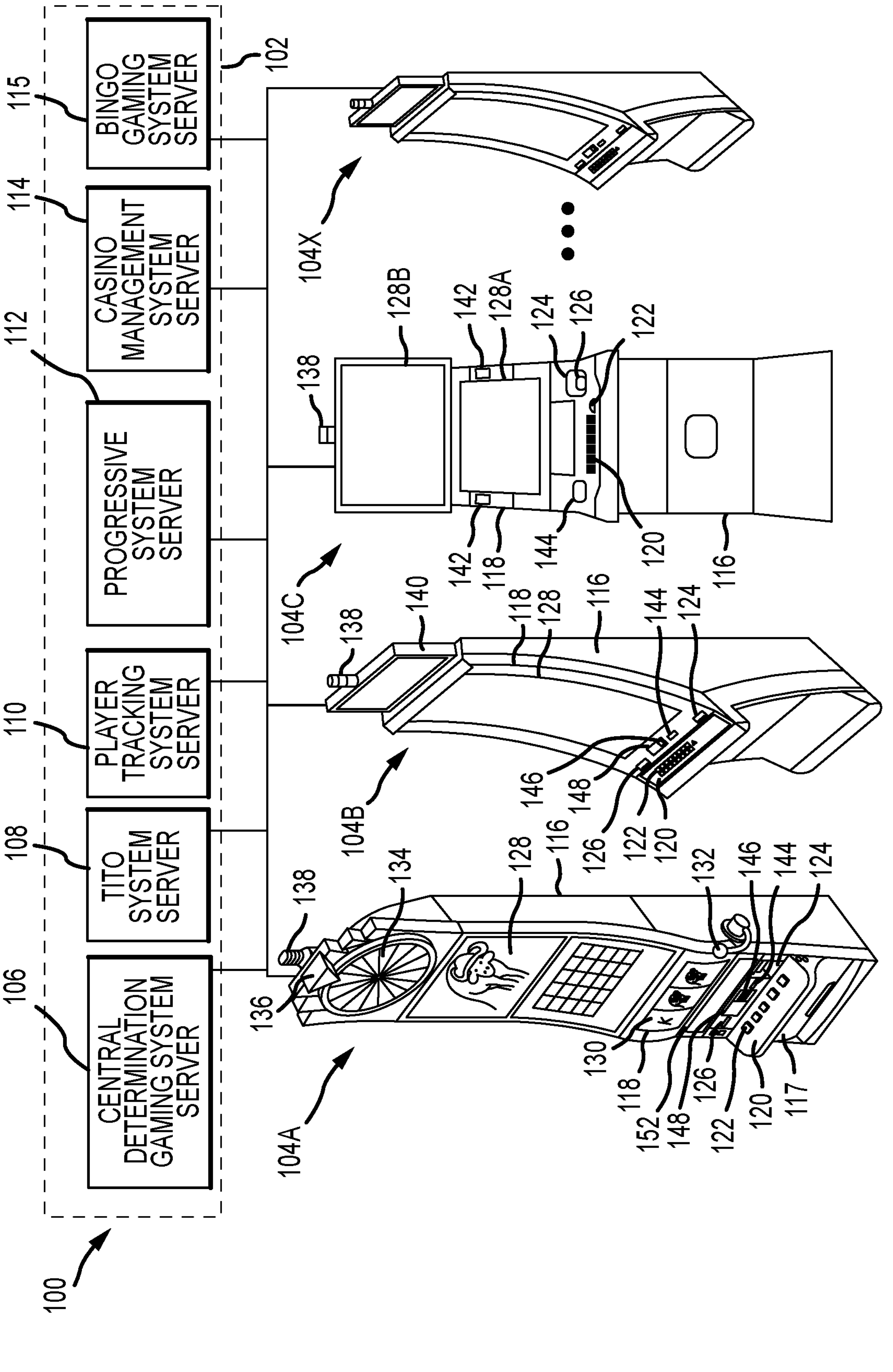
FIG. 1 is a diagram of exemplary EGMs networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a bingo gaming system server 115, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 117 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
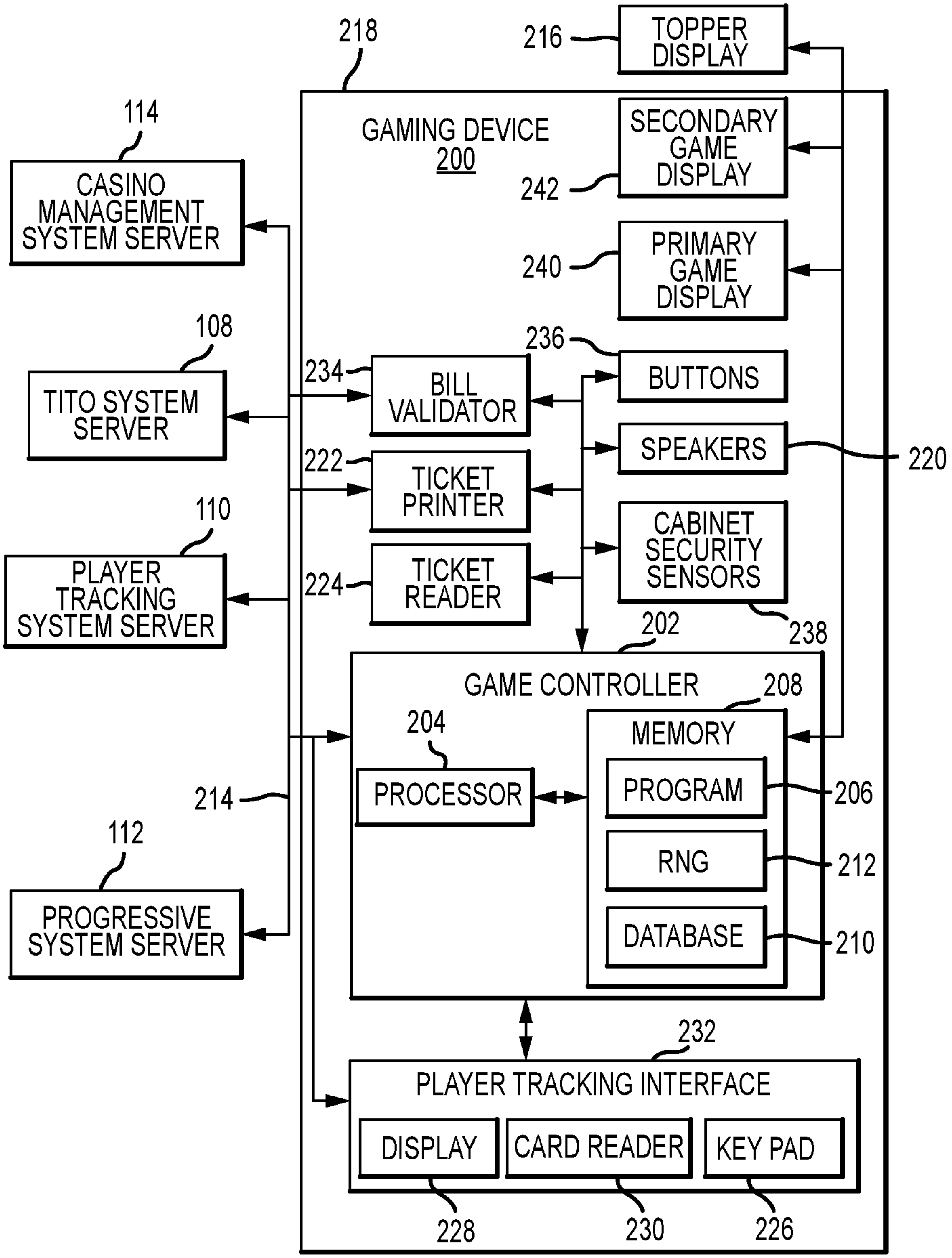
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 117 that opens to provide access to the interior of gaming device 104B. Main door 117, or service door, is typically used by service personnel to refill ticket-out printer 126 and collect bills and tickets inserted into bill validator 124. Main door 117 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A may include a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in memory 208 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

In an exemplary embodiment of the play of class II bingo, a game instance, such as, for example, a round of play of a class II bingo game, may be generated when bingo gaming system server 115 provides a ball call, e.g. a set of bingo numbers, to an EGM 104A-104X to compare with a bingo card and determine a bingo game award, the award then displayed on any of EGMs 104A-104X. In other words, in at least some embodiments, a ball call and/or one or more bingo cards may be generated by a server system, such as bingo gaming system server 115.

Moreover, in some embodiments, bingo gaming system server 115 may provide one or more bingo cards to an EGM 104A-104X as a set or group of bingo cards, such as, for example, in response to a request for one or more bingo cards, and/or one or more bingo cards may be dynamically generated by bingo gaming system server 115 and provided in real-time or pseudo real-time to one or more EGMs 104A-104X. Further, in at least one embodiment, bingo gaming system server 115 may perform the comparison of one or more bingo cards provided to EGMs 104A-104X to a plurality of numbers associated with a ball call. However, in other embodiments, the numbers associated with a ball call may be provided to an EGM 104A-104X, such as, for example, in real-time or pseudo real-time, and each EGM 104A-104X may, in response, perform the comparison between the numbers of the ball call and the numbers of one or more bingo game cards provided to the EGM 104A-104X.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232*a* to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
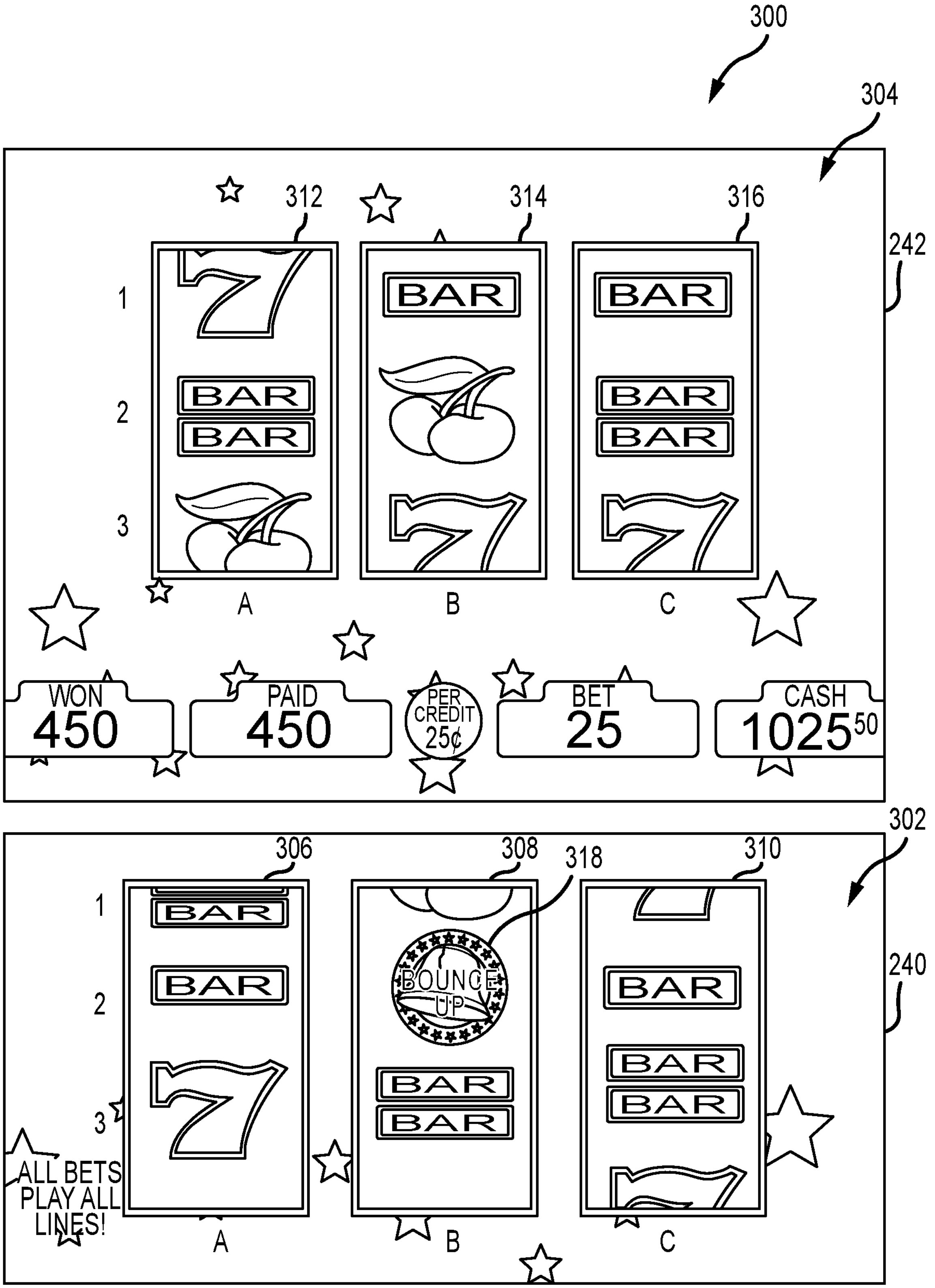
FIG. 3 is a schematic diagram of an exemplary free play bonus game played on an EGM, as shown at FIGS. 1 and 2, in which an active area transitions from a first plurality of reels to a second plurality of reels.

FIG. 3 is a schematic view of a free play bonus game 300 presented or displayed by an EGM 104A-104X (as shown in FIG. 1 and FIG. 2). As shown, free play bonus game 300 may include a first plurality of reels 302 and a second plurality of reels 304. In the exemplary embodiment, reels 302 and 304 may include simulated or "virtual" reels generated and displayed by game controller 202 on primary game display 240 and/or secondary game display 242. In other embodiments, reels 302 and 304 may include one or more physical or mechanical reels having a display element, such as a liquid crystal display (LCD), capable of displaying one or more symbols during gameplay. In other embodiments, reels 302, 304 may include a plurality of mechanical reels overlaid by an LCD panel.

Moreover, in at least one embodiment, first plurality of reels 302 are mechanical reels, and second plurality of reels 304 are simulated or virtual reels. In yet another embodiment, first plurality of reels 302 are virtual reels, and second plurality of reels 304 are mechanical reels. In yet another embodiment, first plurality of reels 302 are mechanical reels, and second plurality of reels 304 are mechanical reels. In yet another embodiment, first plurality of reels 302 are simulated or virtual reels, and second plurality of reels 304 are simulated or virtual reels.

In various embodiments, first plurality of reels 302 may include any number of reels, such as, for example, a first reel 306, a second reel 308, and a third reel 310. Likewise, second plurality of reels 304 may include a first reel 312, a second reel 314, and a third reel 316. Each reel 306-310 of first plurality of reels 302, and each reel 312-316 of second plurality of reels 304, may include a plurality of symbols, such as, for example, a plurality of symbols in the range of only a few to several thousand symbols.

In the exemplary embodiment, some of the symbols of each reel 306-316 are trigger symbols, such as "bounce up" and/or "bounce down" symbols, and some of the symbols of each reel 306-316 are non-trigger symbols, such as, for example, one or more "standard" symbols. As used herein, a "standard" symbol may refer to any symbol that is not capable of triggering a switch from one set of reels 302 and/or 304 to the other set of reels 302 and/or 304 (e.g., any symbol that is not a "bounce up" and/or "bounce down" symbol). Similarly, as used herein, a "trigger" symbol may refer to any symbol capable of triggering a transition or switch, as described herein, between first plurality of reels 302 and second plurality of reels 304. In some embodiments, predefined combinations of standard symbols may result in one or more standard awards, such as one or more standard line wins (e.g., as defined by one or more pay tables of free play bonus game 300).

Each reel 306-316 may include a plurality of symbol positions, which may, together, define a matrix of symbol positions. Each symbol position may be designated by a row number (e.g., "1," "2," "3," etc.) and a column letter (e.g., "A," "B," "C," etc.) For example, the upper-left-most symbol position, occurring on reel 306 at the intersection of row 1 and column A, may be designated by the symbol position "1A." The same alphanumeric designation may apply to reel 312 at the intersection of row 1 and column A.

During gameplay, one or more reels 306-316 may be spun and stopped to display a subset of the symbols of one or more reels 306-316. More particularly, as described herein, reels 306-310 may be spun and stopped while reels 312-316 are held stationary and/or reels 312-316 may be spun and stopped while reels 306-310 are held stationary. In the exemplary embodiment, both sets of reels 302 and 304 are not spun and stopped together but individually, such that only one set of reels 302 and/or 304 is spun and stopped at a time.

In at least some embodiments, three symbols of one or more reels 306-316 may be selected, stopped, and displayed by game controller 202 for presentation to a player. In addition, in at least some embodiments, one or more consecutive symbols are selected for presentation. For example, if a symbol at symbol position "1A" is selected by game controller 202 for presentation, the symbols at symbol positions "2A" and "3A" may also be selected and displayed.

Thus, a plurality of symbols from one or more of first plurality of reels 302 and/or second plurality of reels 304 may be stopped and displayed for presentation to a player of the wagering game. As described above, these symbols may include either or both of one or more trigger symbols and/or one or more standard symbols. In some cases, a trigger symbol may include a "bounce up" and/or "bounce down" symbol, which may, as described herein, cause game controller 202 to shift or transition an active area or an active set of reels 302 and/or 304 of free play bonus game 300 from one of first plurality of reels 302 and/or second plurality of reels 304 to the other of first plurality of reels 302 and/or second plurality of reels 304.

Figure 4:
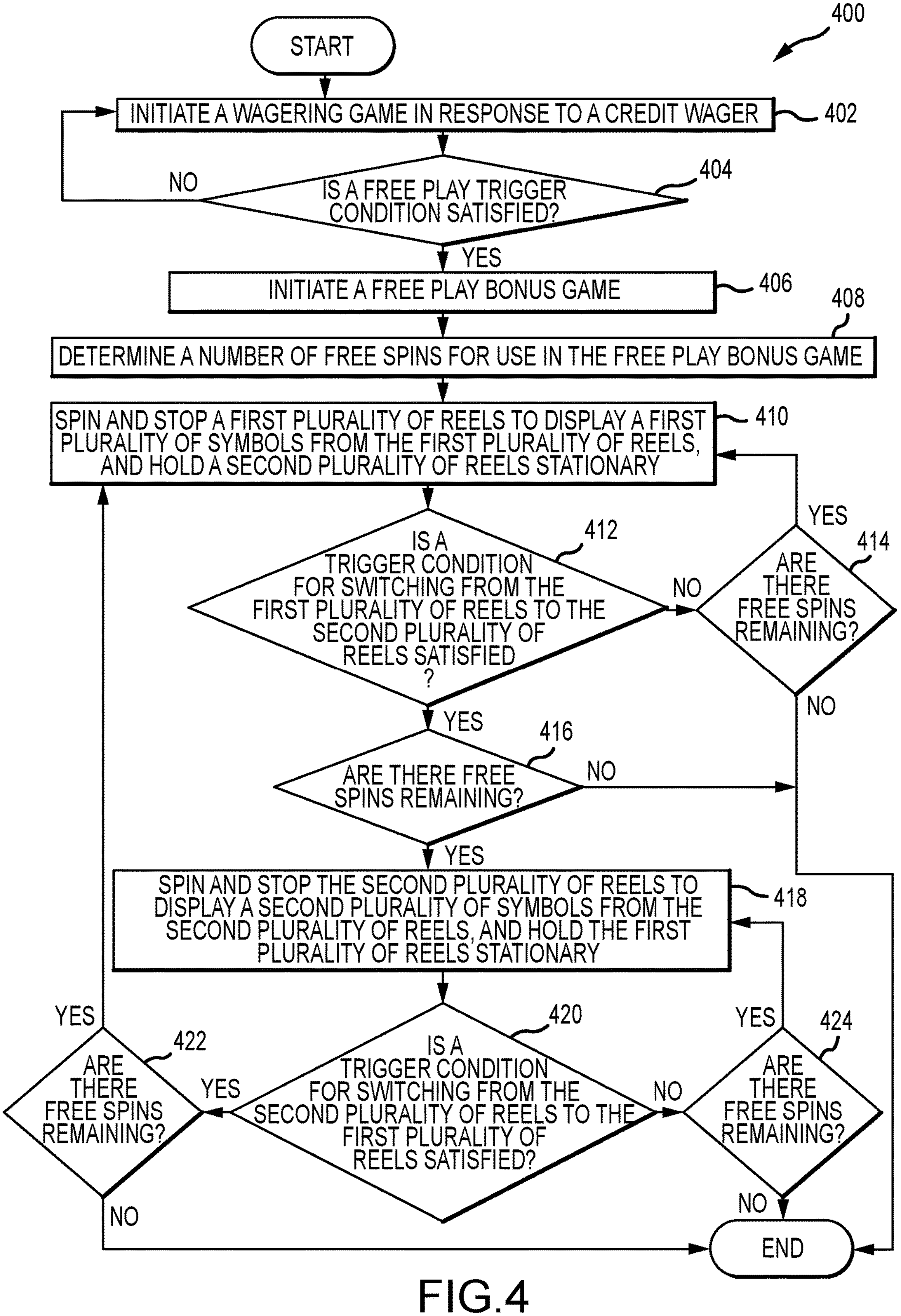
FIG. 4 is a flowchart illustrating an exemplary process of playing an electronic wagering game that includes a free play bonus game, as shown at FIG. 3, in which an active area alternates between a first plurality of reels of the free play bonus game and a second plurality of reels of the free play bonus game.

FIG. 4 is a flowchart illustrating an exemplary process 400 for playing a wagering game that includes free play bonus game 300, as shown at FIG. 3. In the exemplary embodiment, game controller 202 may initiate the wagering game, such as in response to receiving a credit wager from a player (step 402). The wagering game may, in at least some embodiments, include a primary game (e.g., a primary reel game, not shown) and/or a secondary game, such as free play bonus game 300, which may, as described herein, be triggered from the primary game. For example, in some embodiments, free play bonus game 300 may be triggered from a primary game of the wagering game in response to the occurrence of a predefined combination of symbols on one or more reels of the primary game.

In various embodiments, a primary game may include any suitable game of chance. For example, in at least some embodiments, a primary game is a Class II bingo game (e.g., as described above with reference to bingo game system server 115). However, in other embodiments, a primary game may be a Class III "Las Vegas Style" wagering game. Specific details of the type or class of wagering game used are not central to an understanding of the present disclosure and are not described in additional detail herein. Rather, it is sufficient to note that a primary game may be either of a Class II or Class III game.

During play of the primary game, game controller 202 may determine that a free play trigger condition is satisfied, and, in response, initiate free play bonus game 300 (steps 404 and 406). In various embodiments, a free play trigger condition may include any suitable trigger condition, such as, for example, generation by RNG 212 of a random number within a range of random numbers and/or a specific or preselected symbol combination occurring on one or more reels of the primary game. For example, in a Class III embodiment, the free play trigger condition may be satisfied when a preselected or predefined symbol combination occurs on one or more reels of the primary game, such as, for example, a symbol combination associated with a game award that is greater than or equal to a predetermined award value and/or when the predetermined award value is capable of being broken up or segmented into a threshold number of free spins.

In some embodiments, and as described in additional detail below, the free play trigger condition may be satisfied when a number of winning patterns in a bingo-based primary game (e.g., a Class II embodiment) exceeds a threshold number of winning patterns. In other embodiments, the free play trigger condition may be satisfied when an award associated with a winning bingo pattern is greater than or equal to a predetermined award value and/or when the predetermined award value is capable of being broken up or segmented into a threshold number of free spins. It will, however, be appreciated that these free play trigger conditions are merely exemplary and that other free play trigger conditions may be implemented as well.

When free play bonus game 300 is initiated, game controller 202 may award one or more free spins of first plurality of reels 302 and/or second plurality of reels 304 (step 408). The number of free spins awarded may be based upon, in addition to the embodiments described above, any suitable criterion or group of criteria, such as, for example, the value of the random number generated by RNG 212, the symbol combination occurring on the reels of the primary game, and the like.

In addition, in at least one embodiment (e.g., where the wagering game is a bingo game), the number of free spins awarded may correspond to a number of winning bingo patterns occurring in the primary game. For example, a bingo card provided in the primary game may be evaluated against a ball call to determine that the bingo card includes a number of winning patterns. Each winning pattern may be awarded as, or result in, a free spin in free play bonus game 300. As an example, a bingo card provided in the primary game may be evaluated against a ball call to determine that there are ten winning patterns occurring on the bingo card, and each of these ten winning patterns may result in an individual free spin in free play bonus game 300, such that, in this case, ten free spins are awarded. In addition, as described herein, free play bonus game 300 may not be triggered unless the number of winning patterns awarded in the primary game exceeds a threshold number of winning patterns, such as, for example two winning patterns.

In another Class II embodiment, the number of free spins awarded may correspond to a number of segments or portions of a subdivided bingo game award. For example, when the free play trigger condition is satisfied by a bingo game award of sufficient value (as described above), the bingo game award may be subdivided into a plurality of smaller awards, each of which may be associated with a free spin. As an example, a bingo game award of one-thousand credits may be subdivided into ten smaller awards of one-hundred credits each. Each of the ten smaller awards may be associated with an individual free spin, and each of these individual free spins may, as described herein, provide or award one of the ten smaller awards.

In at least one Class III embodiment, the number of free spins awarded may correspond to a number of segments or portions of a subdivided game award in the Class III base game. For example, when the free play trigger condition is satisfied by a primary game award of sufficient value (as described above), the game award may be subdivided into a plurality of smaller awards, each of which may be associated with a free spin, and provided in conjunction with one of the smaller sub-awards.

In another Class II or Class III embodiment, each free spin may correspond to a particular game outcome, such as any winning and/or non-winning game outcome. For example, winning and/or non-winning game outcomes may, in some embodiments, result in free spins. However, and in at least some embodiments, only winning game outcomes may result in free spins. Moreover, as described above, in some embodiments, game controller 202 may (randomly) award a number of free spins.

Thus, free play bonus game 300 may be implemented in Class II and Class III embodiments, and a free play trigger condition and/or a number of free spins awarded during free play bonus game 300 may be variously determined. In addition, the methods for determining the free play trigger condition and/or a number of free spins described above are merely illustrative, and it will be appreciated that other approaches are contemplated and within the scope of the present disclosure.

After game controller 202 determines a number of free spins for free play bonus game 300, game controller 202 may, in at least some embodiments, generate or display free play bonus game 300. During free play bonus game 300, game controller 202 may spin and stop first plurality of reels 302 to display a first plurality of symbols from first plurality of reels 302 (e.g., reels 306-310) (step 410). While first plurality of reels 302 are being spun, second plurality of reels 304 (e.g., reels 312-316) may be held stationary, such that only first plurality of reels 302 are "active" or in motion.

As first plurality of reels 302 come to a stop, one or more symbols may be stopped and displayed from each reel 306-310. Game controller 202 may evaluate the symbols stopped and displayed from first plurality of reels 302 to determine whether a trigger condition (e.g., a trigger condition different from the free play trigger condition in the primary game) has occurred or is satisfied (step 412). If the trigger condition is not satisfied, game controller may determine whether any free spins remain and, if so, re-spin first plurality of reels 302 (steps 414 and 410). If there are no free spins remaining, game controller 202 may return the player to the primary game and/or terminate free play bonus game 300.

If, on the other hand, the trigger condition occurs or is satisfied as a result of spinning first plurality of reels 302, game controller 202 may, in response, determine whether there are any free spins remaining from the plurality of free spins awarded (as described herein) (step 416). In addition, if at least one free spin remains, game controller 202 may spin and stop the second plurality of reels 304 (such that second plurality of reels 304 are "active" or in motion) to display a second plurality of symbols from the second plurality of reels (step 418). Further, first plurality of reels 302 may be held stationary while second plurality of reels 304 are spun and stopped.

Thus, game controller 202 may alternate between spinning first plurality of reels 302 and second plurality of reels 304 (while the other plurality of reels 302 and/or 304 are held stationary) in response to the occurrence of a trigger condition on the plurality of reels 302 and/or 304 being spun. In other words, game controller 202 may switch an "active area" or an "active plurality of reels" (e.g., first plurality of reels 302 and/or second plurality of reels 304) between first plurality of reels 302 and second plurality of reels 304 in response to the occurrence of a trigger condition.

If the trigger condition does not occur (and there are free spins remaining), game controller 202 may not switch between reels 302 and 304. Moreover, each spin of first plurality of reels 302 and/or second plurality of reels 304 may correspond to one free spin of the plurality of awarded free spins, and each time a free spin is used, game controller 202 may decrement the number of free spins remaining for use during free play bonus game 300 by one free spin. When the number of awarded free spins are exhausted, game controller 202 may return the player to the primary game and/or otherwise terminate free play bonus game 300.

In at least one embodiment, a trigger condition of free play bonus game 300 may correspond the occurrence of one or more trigger symbols, such as one or more "bounce up" or "bounce down" symbols. In the exemplary embodiment, "bounce up" symbols may be included on first plurality of reels 302 (e.g., because first plurality of reels 302 may be arranged below second plurality of reels 304, as described above). Similarly, in the exemplary embodiment, "bounce down" symbols may be included on second plurality of reels 304 (e.g., because second plurality of reels 304 may be arranged above first plurality of reels 302, as described above).

Although "bounce up" and "bounce down" symbols are described, it will be appreciated that any suitable symbol or combination of symbols may be used to trigger a switch from one active plurality of reels 302 and/or 304 to the other plurality of reels 302 and/or 304. For example, in one embodiment a "bounce" symbol may be used to trigger a switch from one active plurality of reels 302 and/or 304 to the other plurality of reels 302 and/or 304. Moreover, in at least some embodiments, "bounce up" and/or "bounce down" symbols are randomly selected for display by game controller 202.

More particularly, in the exemplary embodiment, if at least one "bounce up" trigger symbol, such as bounce up trigger symbol 318, is included in the first plurality of symbols stopped and displayed from first plurality of reels 302, game controller 202 may, if at least one free spin remains, shift or switch an active area or active plurality of reels 302 of free play bonus game 300 from first plurality of reels 302 to second plurality of reels 304 (steps 412, 416, and 418).

As a result, the active area (or active plurality of reels) may appear, from a player perspective, to "bounce up" from first plurality of reels 302 to second plurality of reels 304. In FIG. 3, the active area or active reels correspond to first plurality of reels 302.

Figure 5:
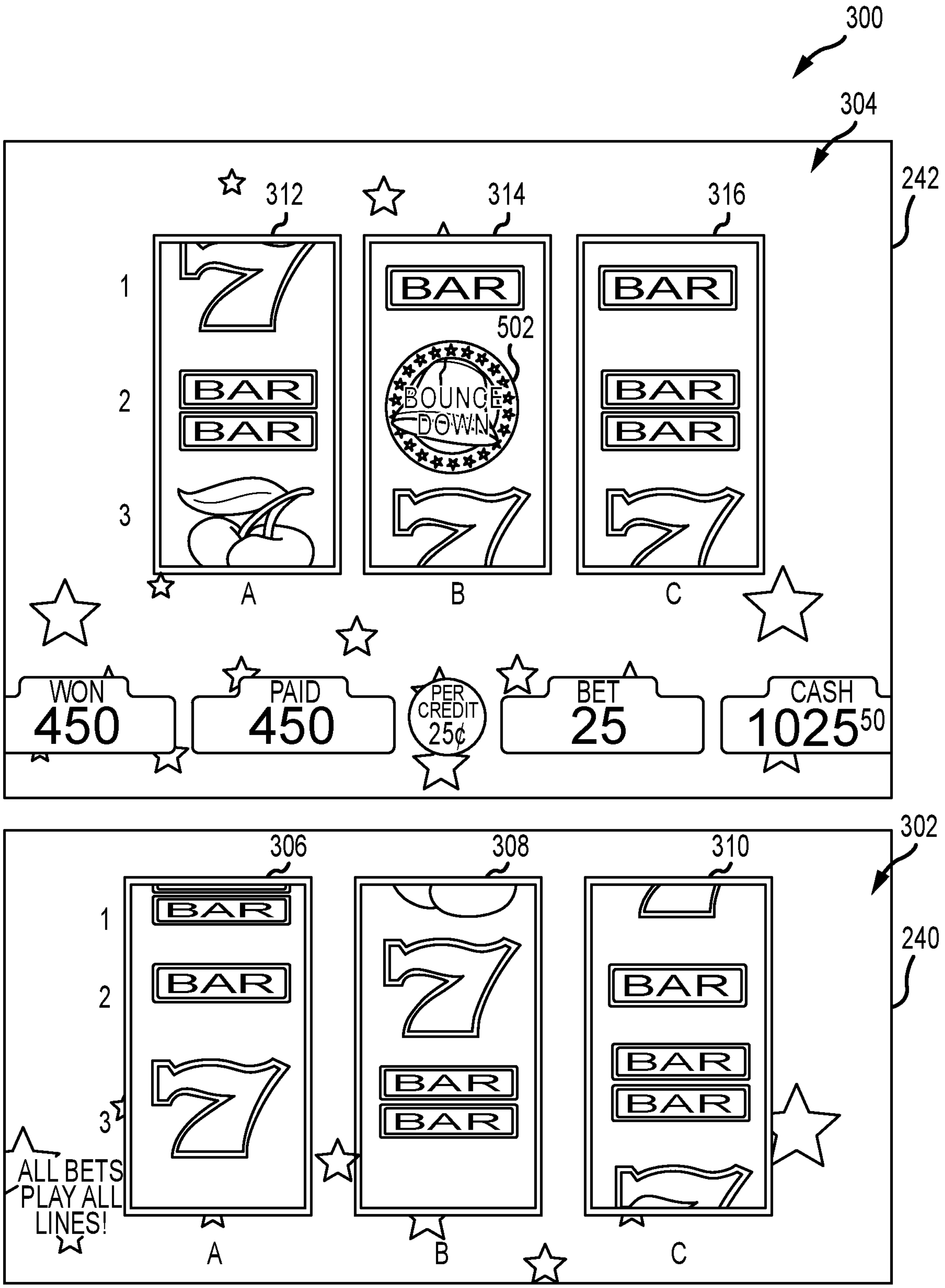
FIG. 5 is a schematic diagram of an exemplary free play bonus game played on an EGM, as shown at FIGS. 1 and 2, in which an active area transitions from a second plurality of reels to a first plurality of reels.

Similarly, if while second plurality of reels 304 are active, at least one "bounce down" trigger symbol is included in the second plurality of symbols stopped and displayed from second plurality of reels 304, game controller 202 may, if at least one free spin remains, shift or switch an active area or active plurality of reels 304 from second plurality of reels 304 back to first plurality of reels 302 (steps 420, 422, and 410). A bounce down trigger symbol 502 is shown with reference to FIG. 5. In FIG. 5, the active area or active reels correspond to second plurality of reels 304.

As a result, the active area (or active plurality of reels) may appear, from a player perspective, to "bounce down" from second plurality of reels 304 to first plurality of reels 302. If there are no free spins remaining, game controller 202 may return the player to the primary game and/or terminate free play bonus game 300 (step 424).

Thus, an active area or active plurality of reels 302 and/or 304 of free play bonus game 300 may alternate between first plurality of reels 302 and second plurality of reels 304, such as, for example, in response to the occurrence (or non-occurrence) of a trigger condition on the active plurality of reels 302 or 304. For instance, if first plurality of reels 302 are active and a trigger condition is satisfied (e.g., if at least one bounce up symbol is stopped and displayed), game controller 202 may transition the active area of free play bonus game 300 from first plurality of reels 302 to second plurality of reels 304. Similarly, if second plurality of reels 304 are active and a trigger condition is satisfied (e.g., if at least one bounce down symbol is stopped and displayed), game controller 202 may transition the active area of free play bonus game 300 from second plurality of reels 304 to first plurality of reels 302.

Accordingly, from a player perspective, gameplay during free play bonus game 300 may appear to alternate between first plurality of reels 302 and second plurality of reels 304 in dependence on the occurrence of a trigger condition. If the trigger condition does not occur, and one or more free spins remain, game controller 202 may not transition the active area from one set of reels to another. For example, if first plurality of reels 302 are active and a trigger condition is not satisfied, game controller 202 may continue to spin and stop first plurality of reels 302 until the trigger condition occurs or until the allocated number of free spins are exhausted. Similarly, if second plurality of reels 304 are active and a trigger condition is not satisfied, game controller 202 may continue to spin and stop second plurality of reels 304 until the trigger condition occurs or until the allocated number of free spins are exhausted.

As described above, in at least one embodiment, the trigger condition necessary for a transition from one set of reels 302 or 304 to the other set of reels 304 or 302 may be satisfied if at least one "bounce up" or "bounce down" symbol occurs on or is included in the symbols stopped and displayed from an active set of reels 302 or 304. However, a variety of other trigger conditions are contemplated.

For example, in at least one embodiment, the occurrence of a "bounce up" or "bounce down" symbol, may or may not be provided or displayed in association with any of the trigger conditions described below.

For example, in some embodiments, a trigger condition may correspond to a determination, by game controller 202, that a credit award associated with a free spin of one set of reels 302 and/or 304 is greater than or less than a credit award associated with a preceding or previous free spin of the reels 302 and/or 304.

More particularly, and as described above, in some embodiments, each free spin may be associated with a credit award, such as, for instance, a credit award derived from or associated with a bingo game outcome of the primary game. In particular, in some embodiments, a plurality of bingo game awards may be provided during the primary game, and each may correspond to a free spin. In addition, each award may be provided to a player during free play bonus game 300 in association with a respective free spin, such that each free spin corresponds to a winning bingo game outcome. In other embodiments, a single bingo game award may be subdivided or partitioned into a plurality of smaller awards, and each smaller award may correspond to a respective free spin.

In either instance, game controller 202 may compare a current bingo game award of a current free spin with a preceding bingo game award of a preceding free spin. For example, if first plurality of reels 302 are active and the current free spin is associated with a current bingo game award greater than a bingo game award associated with an preceding free spin (e.g., the free spin immediately preceding the current free spin), game controller 202 may shift or transition the active set of reels from first plurality of reels 302 to second plurality of reels 304.

In other words, if a current free spin of first plurality of reels 302 is associated with a game award that is greater than the game award associated with the preceding spin of first plurality of reels 302, game controller may shift the active area from first plurality of reels 302 to second plurality of reels 304. As a result, gameplay may appear, from a player perspective, to "bounce up" to second plurality of reels 304 when a player's game award increases over a previous award. In addition, a "bounce up" or "bounce down" symbol may be displayed by game controller 202 on either set of reels 302 or 304 as a result of the award determination, as described above.

Further, in some instances, a plurality of equivalent game awards may be provided such that, following a "bounce up" trigger on the first plurality of reels 302, a plurality of free spins (each corresponding to one of the plurality of equivalent game awards) providing awards equal to the "bounce up" triggering award may be presented on the second plurality of reels 304. In other words, if a "bounce up" triggering award occurs on first plurality of reels 302, one or more awards equivalent to (or different in value from) the bounce up triggering award may be provided in association with one or more free spins of second plurality of reels 304.

Similarly, in some embodiments, if second plurality of reels 304 are active and the current free spin is associated with a current bingo game award greater than a bingo game award associated with an preceding free spin (e.g., the free spin immediately preceding the current free spin), game controller 202 may shift or transition the active set of reels from second plurality of reels 304 to first plurality of reels 302. In other words, if a current free spin of second plurality of reels 304 is associated with a game award that is greater than the game award associated with the preceding spin of second plurality of reels 304, game controller may shift the active area from second plurality of reels 304 to first plurality of reels 302. As a result, gameplay may appear, from a player perspective, to "bounce down" to first plurality of reels 302 when a player's game award increases over a previous award. Further, if reels 302 are active when such a trigger condition occurs, game controller 202 may not shift the active area to second plurality of reels 304. Rather, game controller 202 may leave reels 302 as the active set of reels.

In various embodiments, any of a variety of other trigger conditions may cause an active area to shift between reels 302 and reels 304. For example, in some embodiments, the occurrence of one or more predefined winning patterns of symbols on reels 302 may cause a "bounce up" from reels 302 to reels 304. Likewise, where reels 304 are active, the occurrence of one or more predefined winning patterns of symbols on reels 304 may cause a "bounce down" from reels 304 to reels 302.

Moreover, in some embodiments, a trigger condition for shifting an active area between reels 302 and reels 304 may simply include a count-up or count-down feature. For example, in at least one embodiment, a number of free spins awarded to a player may be divided or partitioned into groups or sets of free spins (e.g., a total of one-hundred free spins may be partitioned into ten groups of ten free spins). Once a total number of free spins are partitioned in this manner, game controller 202 may count-up or count-down from each group or subset of spins, and each time a subset of spins is completed or used by the player, game controller may cause the active area to transition to the other of reels 302 or reels 304. For example, if a player is awarded ten groups of ten free spins each, game controller 202 may transition an active area between reels 302 and reels 304 each time a group of ten free spins is used by the player.

In another embodiment, a size of a game award may be partitioned or divided into a plurality of smaller game awards. For example, as described above, a game award of one-hundred credits may be partitioned into ten game awards of ten credits each. However, in some embodiments, a game award may be unevenly subdivided or partitioned. For example, a game award of one-hundred credits may be subdivided into two game awards of twenty-five credits and five game awards of ten credits. In such an embodiment, each of the seven subdivided game awards may be associated, as described herein, with a free spin, and each time a free spin associated with a larger (e.g., twenty-five credit) game award is used, if reels 302 are active, game controller 202 may transition the active area to second plurality of reels 304. Similarly, if reels 304 are active, each time a free spin associated with a smaller (e.g., ten credit) game award is used, game controller 202 may transition the active area to first plurality of reels 302.

Moreover, in at least some embodiments, a game award may be subdivided (e.g., evenly or unevenly, as described herein), and half of the free spins associated with the subdivided game awards (irrespective of the value of each game award) may be allocated to first plurality of reels 302, and the other half of the free spins may be allocated to second plurality of reels 304. In other words, in at least some embodiments, a number of free spins may simply be evenly split between reels 302 and reels 304.

Further, in some embodiments, a variety of bounce patterns may be applied by game controller 202. For example, game controller may bounce between reels 302 and reels 304 after a specified number of free spins. In one example, if a bounce pattern is to bounce every two free spins, and ten free spins are awarded, the active reels may play as follows: reels 302, reels 302, reels 304, reels 304, reels 302, reels 302, reels 304, reels 304, reels 302, reels 302. This bounce pattern is merely exemplary, however, and it will be appreciated that any suitable and/or exciting bounce pattern may be applied by game controller 202.

In yet another embodiment, a player may be allowed to choose a volatility of free play bonus game 300. In such an embodiment, a higher volatility option may cause a smaller number of bounces up, but in association with larger game awards, while a lower volatility option may cause a larger number of bounces up in association with smaller game awards.

In another embodiment, a player may be challenged to spell a word or phrase on first plurality of reels 302, such as, for example, the word "BONUS." In this embodiment, reels 302 include letter symbols. Further, in this example, if the player, after a free spin, has the letters "B," "N," and "S," these letters may be locked, and the remaining symbols may be re-spun, such as by using another free spin, whereby the player may attempt to achieve the remaining letters "0," and "U" on the unlocked or still-spinning symbol positions of reels 302. If the player successfully spells the word "BONUS," game controller 202 may cause the active area to bounce up to reels 304, and a bonus award may be provided. Although in this example the word "BONUS" was described, it will be appreciated that a player may be challenged to spell any word or phrase. Similarly, it will be appreciated that a player may not be challenged to spell a word or phrase but to collect a specified plurality or arrangement of symbols or numbers.

In yet another embodiment, a multiplier (e.g., ×2, ×3, ×5, ×10, etc.) may appear in any symbol position of reels 302. In response to the occurrence of a multiplier in a symbol position of reels 302, game controller may cause the active area to "bounce up" to reels 304 for a free spin, during which game controller 202 may multiply the game award provided as a result of the free spin—multiplied by the multiplier—to the player. Likewise, in some embodiments, a multiplier may appear in conjunction with a number of free spins (e.g., ×2 for twenty spins, ×3 for ten spins, ×5 for five spins, ×10 for three spins, etc.) in any symbol position of reels 302, and game controller may cause the active area to "bounce up" to reels 304 for the specified number of free spins. During each free spin of the specified number of free spins, game controller 202 may, in addition, multiply the game award associated with each free spin by the designated multiplier. In further embodiments a multiplier may appear randomly, e.g. randomly selected and displayed on a video display, in association with a "bounce up" to reels 304 for a free spin.

An electronic gaming machine configured to alternate between a first plurality of reels and a second plurality of reels during a free play bonus game is thus described. In at least one embodiment, the first plurality of reels are displayed below the second plurality of reels to give the appearance of a lower set of reels (e.g., the first plurality of reels) and an upper set of reels (e.g., the second plurality of reels). The first plurality of reels include one or more trigger symbols, such as one or more "bounce up" symbols. Likewise, the second plurality of reels include one or more trigger symbols, such as one or more "bounce down" symbols.

In various embodiments, only one of the first plurality of reels or the second plurality of reels may be "active," in that one, but not both, of the first plurality of reels or the second plurality of reels may be spun and stopped at any given time. Moreover, in at least one embodiment, if the first plurality of reels are active and a "bounce up" symbol lands or is stopped and displayed from the first plurality of reels, a game controller of the electronic gaming machine may transition the active area or active set of reels from the first plurality of reels to the second plurality of reels. Likewise, if the second plurality of reels are active and a "bounce down" symbols lands or is stopped and displayed from the second plurality of reels, the game controller may transition the active area or active set of reels from the second plurality of reels to the first plurality of reels. Thus, during gameplay, an active area or active set of reels may appear to alternate (or bounce up and down) between the first set of reels and the second set of reels.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
- at least one memory with instructions stored thereon; and
- at least one processor in communication with the at least one memory, wherein the instructions, when executed by the at least one processor, cause the at least one processor to:
  - provide a number of plays for an electronic game, the electronic game comprising a first instance of the electronic game in a first display area and a second instance of the electronic game in a second display area;
  - cause display of a first outcome for the first instance of the electronic game in the first display area, wherein when the first outcome for the first instance of the electronic game is displayed, the second display area is inactive;
  - based at least in part upon at least one of the number of plays remaining, cause display of a first outcome for the second instance of the electronic game in the second display area, wherein when the first outcome for the second instance of the electronic game is displayed, the first display area is inactive; and
  - based at least in part upon at least one of the number of plays remaining, cause display of a second outcome for the first instance of the electronic game in the first display area, wherein when the second outcome for the first instance of the electronic game is displayed, the second display area is inactive.

2. The electronic gaming device of claim 1, wherein the instructions further cause the at least one processor to cause display of at least one of the first outcome for the first instance of the electronic game, the first outcome for the second instance of the electronic game, or the second outcome for the first instance of the electronic game based on at least one message received from a server.

3. The electronic gaming device of claim 2, wherein the electronic game comprises a game associated with a random number generator (RNG) and one or more paytables.

4. The electronic gaming device of claim 2, wherein the electronic game comprises a bingo game.

5. The electronic gaming device of claim 4, wherein the instructions further cause the at least one processor to:
- receive the at least one message from the server, wherein the at least one message is associated with a total output for the number of plays; and
- provide the first outcome for the first instance of the electronic game, the first outcome for the second instance of the electronic game, and the second outcome for the first instance of the electronic game as subdivisions of the total output.

6. The electronic gaming device of claim 5, wherein the at least one message is associated with the total output by comprising a bingo ball call.

7. The electronic gaming device of claim 1, wherein the instructions further cause the at least one processor to cause display of the first outcome for the second instance of the electronic game in the second display area based on a trigger condition for transitioning from the first display area to the second display area being satisfied.

8. The electronic gaming device of claim 7, wherein the instructions further cause the at least one processor to determine the trigger condition is satisfied based on the first outcome for the second instance of the electronic game being associated with a greater output than the first outcome for the first instance of the electronic game.

9. The electronic gaming device of claim 7, wherein the instructions further cause the at least one processor to determine the trigger condition is satisfied based on a trigger symbol being included in the first outcome for the first instance of the electronic game.

10. An electronic gaming system comprising:

at least one memory with instructions stored thereon; and at least one processor in communication with the at least one memory, wherein the instructions, when executed by the at least one processor, cause the at least one processor to:

determine a number of plays for an electronic game comprising a first instance of the electronic game in a first display area and a second instance of the electronic game in a second display area;

cause a first outcome for the first instance of the electronic game to be displayed in the first display area, wherein when the first outcome for the first instance of the electronic game is displayed, the second display area is inactive;

based at least in part upon at least one of the number of plays remaining, cause a first outcome for the second instance of the electronic game to be displayed in the second display area, wherein when the first outcome for the second instance of the electronic game is displayed, the first display area is inactive; and based at least in part upon at least one of the number of plays remaining, cause a second outcome for the first instance of the electronic game to be displayed in the first display area, wherein when the second outcome for the first instance of the electronic game is displayed, the second display area is inactive.

11. The electronic gaming system of claim 10, wherein the instructions further cause the at least one processor to at least one of cause the first outcome for the first instance of the electronic game to be displayed, cause the first outcome for the second instance of the electronic game to be displayed, or cause the second outcome for the first instance of the electronic game to be displayed by transmitting at least one message to an electronic gaming device where the first display area and the second display area are displayed.

12. The electronic gaming system of claim 11, wherein the electronic game comprises a game associated with a random number generator (RNG) and one or more paytables.

13. The electronic gaming system of claim 11, wherein the electronic game comprises a bingo game.

14. The electronic gaming system of claim 13, wherein the instructions further cause the at least one processor to:

generate the at least one message, wherein the at least one message is associated with a total output for the number of plays; and cause the first outcome for the first instance of the electronic game, the first outcome for the second instance of the electronic game, and the second outcome for the first instance of the electronic game to be provided at the electronic gaming device as subdivisions of the total output.

15. The electronic gaming system of claim 14, wherein the electronic gaming device, upon receipt of the at least one message, is configured to determine the subdivisions of the total output.

16. The electronic gaming system of claim 14, wherein the instructions further cause the at least one processor to:

determine a bingo ball call; and include the bingo ball call in the at least one message.

17. The electronic gaming system of claim 10, wherein the instructions further cause the at least one processor to cause the first outcome for the second instance of the electronic game to be displayed in the second display area based on a trigger condition for transitioning from the first display area to the second display area being satisfied.

18. The electronic gaming system of claim 17, wherein the instructions further cause the at least one processor to determine the trigger condition is satisfied based on the first outcome for the second instance of the electronic game being associated with a greater output than the first outcome for the first instance of the electronic game.

19. At least one non-transitory computer-readable storage medium with instructions stored thereon that, in response to execution by at least one processor, cause the at least one processor to:

provide a number of plays for an electronic game comprising a first instance of the electronic game in a first display area and a second instance of the electronic game in a second display area, the number of plays comprising:

a first outcome for the first instance of the electronic game displayed in the first display area, wherein when the first outcome for the first instance of the electronic game is displayed, the second display area is inactive;

based at least in part upon at least one of the number of plays remaining, a first outcome for the second instance of the electronic game displayed in the second display area, wherein when the first outcome for the second instance of the electronic game is displayed, the first display area is inactive; and based at least in part upon at least one of the number of plays remaining, a second outcome for the first instance of the electronic game displayed in the first display area, wherein when the second outcome for the first instance of the electronic game is displayed, the second display area is inactive.

20. The at least one non-transitory computer-readable storage medium of claim 19, wherein the instructions further cause the at least one processor to provide the number of plays for the electronic game based at least in part upon at least one message received from at least one server, wherein the at least one message is associated with a bingo ball call.

* * * * *